Jan. 12, 1960

W. H. DU SHANE 2,920,705

AUTOMATIC LOAD AND LEVELLING CONTROL FOR
AGRICULTURAL TRACTORS AND IMPLEMENTS

Filed Aug. 8, 1955

INVENTOR.
W. H. DuSHANE

*INVENTOR.*
W. H. DuSHANE

# United States Patent Office 2,920,705
Patented Jan. 12, 1960

2,920,705

AUTOMATIC LOAD AND LEVELLING CONTROL FOR AGRICULTURAL TRACTORS AND IMPLEMENTS

Wallace H. Du Shane, Waterloo, Iowa, assignor, by mesne assignments, to Deere & Company, a corporation of Delaware Application August 8, 1955, Serial No. 527,043

26 Claims. (Cl. 172—9)

This invention relates to means for hitching an agricultural implement to an agricultural tractor and more particularly to a hitching arrangement of the so-called three-point type modified, according to significant features of the present invention, to include automatic load and levelling control.

Implements connected directly to tractors, sometimes known as integral implements, perform significantly better if they are kept parallel to the ground. This is of particular importance when the land is rolling. In some cases, the hitch includes mechanical linkage purportedly designed to accomplish this result by relating the center of rotation of the implement directly to the line of draft. In cases in which the line of draft is low, the center of rotation of the implement is too far forward to contribute to the necessary levelling. According to the present invention, the center of rotation of the implement is fixed, regardless of the line of draft, with the necessary correcting energy supplied by power-operated means on the tractor. An important feature in keeping the implement parallel to the ground in operation is the derivation therefrom of the benefit of a more nearly true draft signal, because this arrangement eliminates false high pressures due to high ground pressure on the rear of a long implement in going through a swale, for example, or a false low pressure due to low ground pressure on the rear of a long implement going over a hill.

The invention features the provision of novel and relatively simple means incorporating the desirable characteristics of draft or load control with the automatically levelling arrangement. The invention has as another object the provision of means for selectively using load or position control. A still further object is the interconnection of the levelling system to impose position-responsive forces on the control system during operation of the levelling means.

Briefly, and specifically, these and other important objects and desirable features inherent in and encompassed by the invention are accomplished in one preferred form by the mounting on the tractor of a pair of hydraulic cylinders, each of which controls a rockshaft, one rockshaft being connected to a top or signal link for levelling the implement and the other rockshaft being connected to the trailing draft links for raising and lowering the implement. Separate valves are utilized for controlling the separate cylinders and these are interconnected by differential follow-up linkage in such manner that each of the valves is independently responsive to manual initiating force and position-initiated force, with the draft link cylinder valve additionally responsive to variations in draft load on the implement.

A preferred embodiment of the invention is disclosed in detail in the ensuing specification and accompanying drawings, the several figures of which are described immediately below.

Fig. 1 is a schematic view, partly in section, of a preferred embodiment of the invention.

Figure 2:
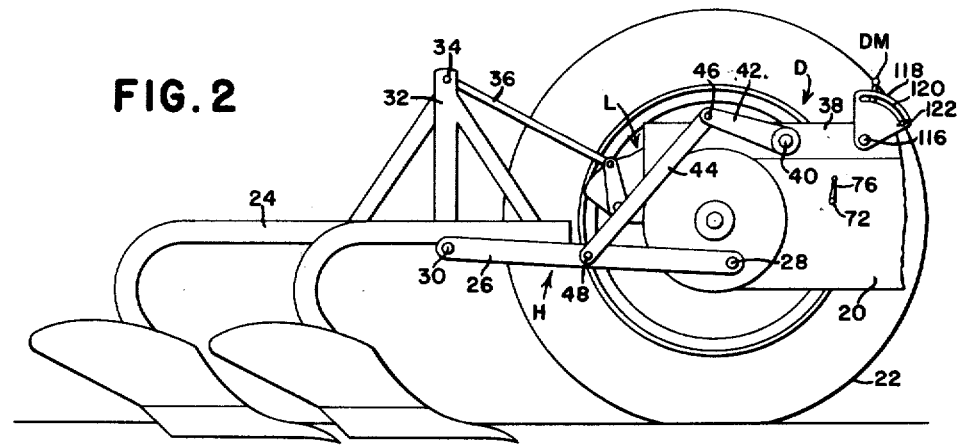
Fig. 2 is a view of a representative tractor-implement outfit in which the system of Fig. 1 can be incorporated.

Those familiar with the general problems discussed herein will recognize in Fig. 2 the rear portion of a tractor as including a main body 20 carried on traction wheels, only one of which is shown at 22. An implement, such as a plow 24, is connected to the tractor by hitch means H of the so-called three-point type. This hitch means includes lower trailing draft link means 26 pivoted at 28 to the tractor on a transverse axis for vertical adjustment. The link means 26 is pivotally connected at 30 to the implement 24, also on a transverse axis. A rigid mast 32 on the implement affords an upper transverse pivot 34 for the rear end of a top or signal link means 36. As is not unconventional, the implement tends to pivot about the pivot 30 as ground working loads thereon vary. Accordingly, as the implement so pivots, it does so in a fore-and-aft direction and is therefore capable of transmitting fore-and-aft forces through the signal link 36. In the conventional three-point system, the signal received and transmitted by the top link is utilized to control an actuator, such as a valve in a hydraulic circuit, for activating and de-activating power-operated means to raise and lower the draft link means 26 and therefore to vary the working depth of the implement. In the present case, a first power-operated means or unit is identified in its entirety by the letter D. This unit is incorporated in a housing 38 rigidly mounted on a rear portion of the tractor body 20 and journaling a first transverse rockshaft 40 to which is rigidly affixed rearwardly extending arm means 42 for raising and lowering the draft link means 26 through the medium of a lift link 44. It will be understood that in a conventional system the rockshaft such as 40 carries a pair of arms like the arm means 42 and such pair of arms will be connected by a pair of lift links to a pair of draft links. However, for present purposes there is no significance in the duplication. The necessary articulation in the lift mechanism is accommodated by pivots at 46 and 48, respectively at opposite ends of the lift link 44 and its connections, respectively, to the arm 42 and draft link 26.

The power means D further includes a one-way fluid motor 50 having a piston 52 connected by a piston rod 54 to an internal arm 56 that is keyed to the rockshaft 40. The connection between the piston rod 54 and the piston 52 is conventionally separable, as at 58, so that clockwise movement of the rockshaft 40 is possible without restriction by the piston 52.

Figure 3:
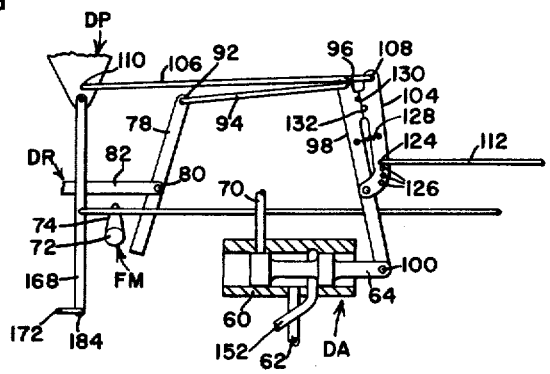
Fig. 3 is a schematic view, partly in section, of a fragment of Fig. 1 and illustrating certain of the parts in different positions.

The motor or cylinder 50 is under control of a first actuator DA which may be selectively influenced by a draft or load responder DR, a position responder DP and a manually movable control member DM. The actuator is in the form of a valve housing 60 connected by a high pressure line 62 to a pump P and having a valve 64 selectively shiftable to active positions at opposite sides of a central neutral position. The neutral position of the valve is shown in Figs. 1 and 3. The fluid pressure system is illustrated as being of the constant-pressure type and the valve housing 60 is open at opposite ends, as at 66 and 68, to the reservoir and further includes a motor line 70 leading to the lower end of the motor 50. Shifting of the valve 64 to the right as seen in Fig. 1 uncovers the motor line to the reservoir and allows the piston 52 to move downwardly or to the lower end of the motor, which is normally effected by the weight of the implement connected to the rockshaft 40 via the draft link 26 and lift link 44. When the valve 64 is shifted to the left of its neutral position, the high pressure line 62 is connected to the motor line 70 and raising of the implement is accomplished, the rockshaft 40 of course rotating in a clockwise direction.

A tractor mounted fulcrum means FM, suitably supported in any appropriate portion of the tractor body and comprising a transverse rockshaft 72 and internal cam 74, is selectively bi-positionable and is capable of achieving the position of Fig. 1 or the position of Fig. 3. For instant purposes, the remainder of the organization will be described in terms of the Fig. 1 position of FM. The two positions of the fulcrum means may be obtained through the medium of an external hand lever 76 (Fig. 2.) A first lever 78 is pivoted intermediate its ends at 80 on the forward end of a rod 82 that is rigidly attached to a piston 84 forming part of the load responder DR. The piston is carried in a small cylinder 86 and is biased against a stop 88 by a load-control spring 90. Description of the functioning of the load responder DR will be postponed. The lower end of the lever 78 is engaged by the cam 74 of the fulcrum means FM and the opposite end of the lever is pivotally connected at 92 to a force-transmitting link 94, the remote end of which is pivotally connected at 96 to the upper end of a second lever 98. The lower end of the lever 98 is pivotally connected at 100 to the front end of the actuator valve 64 and an intermediate portion of the lever 98 has a pivot mount 102 for mounting a third lever 104. A force-transmitting link 106 is pivotally connected at 108 at its front end to the upper end of the third lever 104 and is pivotally connected at 110 at its rear end to the first position responder DP.

A force-transmitting link 112 is, in the form of the invention shown in Figs. 1 and 3, pivotally connected at 114 to the first manually movable member DM, which itself is fulcrumed at 116 on an appropriate supporting portion formed as part of the supporting housing 38. As shown in Fig. 2, the hand lever or manually movable member DM is usable in conjunction with a support-mounted sector 118 of the usual type incorporating friction means or the like (not shown) for maintaining any set position of the lever. The sector has a slot 120 through the range of which an adjustable stop 122 may be positioned to establish a limit or index for movement of the manually moveable member DM. These details are in general not unknown and are deemed to require no further elaboration here.

The rear end of the link 112 is selectively adjustably connectible to the auxiliary lever 104 for effecting variation in the relationship or moment arm between the pivot mount 102 and the pivot, as at 124, between the lever 104 and the link 112. The adjustment is preferably accomplished by the provision of a plurality of holes 126, any one of which may be used for effecting the connection. It will be seen that the moment arm between the connection 124 and the pivot mount 102 may thus be increased or decreased according to whichever hole 126 is used.

On the basis of the description thus far, the lever 78, being connected to the load responder DR, may be considered a load lever. The lever 98, being connected to the valve 64, may be considered a first actuator lever. Because of the duality in function of the lever 104, it will be referred to as an auxiliary lever, for it is instrumental in the response of the system to variations in load, as reflected by the load responder DR, as well as to variations in the position of the implement, as reflected by the position responder DP, which responder is in the form of an arm rigidly secured to the rockshaft 40 and consequently rockable therewith. It is a feature of the invention, as will be brought out later, that the amount of position compensation may be varied or may be locked out altogether, according to the adjustment of the fulcrum means FM and according to the adjustment made at 124—126.

A small tension spring 128 represents biasing means inter-connecting the levers 98 and 104 and urging the levers constantly together. However, when the fulcrum means FM is in the position of Fig. 1, the cam 74 serves as a fulcrum for the lower end of the load lever 78 and the result is that the levers 98 and 104 are spaced angularly apart, as will be determined by the spacing between respective stops 130 and 132 on the levers.

The operational aspects of the draft or load control portion of the system may best be understood by ignoring for the moment the relationship thereto of the automatic levelling portion of the system. Therefore, it will be temporarily assumed that the load responder DR is in some manner or another shiftable forwardly in opposition to the load control spring 90 as draft or load on the implement increases. Hence, with the parts positioned as shown in Fig. 1 and the plow operating at an extremely shallow depth, increased depth may be achieved by moving the hand lever DM forwardly. The link 112, connection 124, lever 104 and pivot mount 102 serve as force-transmitting means for pivoting the actuator lever 98 in a counterclockwise direction about the fulcrum established by the pivot 96, since the lever 78 and position responder DP are fixed for the moment. Swinging of the actuator lever 98 in the manner just described causes the valve 64 to shift to the right, thus opening the motor line 70 to the reservoir via 66. The weight of the implement and the ground force thereon cause the implement to descend to a position determined in the first instance by the angular position of the hand lever DM. As the draft forces reach the value so determined, the load responder piston 84 will have been shifted forwardly against the action of the spring 90 until the draft or load balances against the action of the spring. When the load responder shifts forwardly, it carries the pivot 80 to the lever 78 also forwardly and this forward movement is complemented by the spring 128 which pivots the lever 98 forwardly about the fulcrum now established by the pivot mount 102, since the position of the hand lever DM is fixed. The valve 64 is thus returned to the left to its neutral position and exhaust from the motor ceases. If the draft force increases beyond the predetermined value, the load responder will shift forwardly as above, again resulting in leftward shifting of the valve 64, but in this case the shifting will be to the left of the neutral position and the high pressure line 62 will be connected to the motor line 70 so that the motor 50 is extended and the implement will be lifted as the lift rockshaft 40 rotates in a clockwise direction.

According to the setting of Fig. 1, there is no position compensation involved. That is to say, the actuator DA is not affected by the angular change in position of the position responder DP. This result is accomplished because the distance between the connection 124 and the pivot mount 102 is substantially negligible. The degree of position responsiveness can be varied by moving the pivotal connection 124 farther from the pivot mount 102, in which case the system will partake of both load and position compensation, a broad proposition which is not unknown to the art. The novelty here lies in the specific manner of accomplishing variations in load and position influence, which means has already been described as including the adjustable positioning of the pivot 124 via selection of one or another of the several holes 126.

Fig. 3 shows a changed position of the fulcrum means FM to what may be called a position-responsive position. Stated otherwise, the load control influence is locked out. As will be seen, the rockshaft 72 of the fulcrum means FM has been turned so that the cam 74 no longer contacts the load lever 78. Thereupon, the spring 128 draws the levers 98 and 104 together so that the stops 130 and 132 interengage. The levers 98 and 104 now function as one and changes in position of the load responder DR will have no effect on the actuator DA. On the other hand, the actuator will be wholly responsive to the position responder DP.

According to the present invention, the draft control means D is combined with automatic levelling means L. The levelling means comprises a levelling motor 134, which is two-way or bi-directional, having a piston 136 connected by a piston rod 138 to an internal arm 140 which is fixed to a transverse second rockshaft 142. This rockshaft has keyed thereto an external arm 144 to which the front end of the top or signal link 36 is pivoted at 146. The levelling or pitch-compensating motor 134 is under control of a levelling or pitch-control actuator LA, which actuator includes a valve housing 148 having a shiftable valve 150 to the valve bore of which fluid under pressure from the pump P is supplied via the valve housing 60 and a secondary high pressure line 152. Opposite ends of the valve housing 148 are opened to exhaust, as at 154 and 156.

In order that fluid pressure changes in the head or upper end of the levelling motor 134 may be utilized to actuate the load responder DR, the upper end of the motor is connected by a fluid line 158 to the cylinder 86 of the load responder. A second fluid line 160, leading from the load responder cylinder 86 to the valve bore of the valve housing 148 for the levelling actuator LA, constitutes a continuation of the line 158. The valve housing 148 is connected by a line 162 to the load responder cylinder 86 ahead of the load responder piston 84, and a branch line 164 leads from the line 162 to the lower end of the cylinder or levelling motor 134. In other words, opposite ends of the motor 134 are connected to the valve LA and are therefore selectively connectible to the reservoir or to the pressure source established by the pump P. This gives the motor 134 its bi-directional characteristics and establishes the motor as a second power-operated unit or device.

As will be seen from the description thus far, if the valve 150 of the second actuator LA is shifted to the right, the high pressure line 152 is connected to the line 162 and line 164 for supplying fluid under pressure below the piston 136, therefore effecting clockwise rocking of the levelling rockshaft 142 and thus, via the signal link 36 and mast 32, causing the implement to rotate clockwise about the lower link pivot 30. When the valve 150 is shifted to the right, the motor at the top end of the piston is connected via the lines 158—86—160 to the reservoir at 154. When the valve 150 is shifted to the left, the high pressure line 152 is connected to the upper end of the motor 134 via the lines established at 160—86—158 and the lower end of the motor is exhausted via 164—162—156.

Control of the actuator LA is influenced by a second manually movable member or hand control lever LM and a second position responder LP. The interconnection of the three components LM, LA and LP is effected by differential follow-up means comprising a second actuator lever 166, a responder lever 168 and links 170, 172 and 174. The link 170 is pivotally connected at its rear end at 176 to the second position responder LP and is pivotally connected at its forward end at 178 to the top end of the second actuator lever 166. This lever is pivotally connected at its lower end at 180 to the front end of the actuator or valve 150. The link 172 is pivotally connected at 182 to a midportion of the lever 166 and is pivotally connected at 184 to the lower end of the lever 168. The upper end of the lever 168 is pivotally connected at 186 to the position responder DP. A pivotal connection 188 is effected between a midportion of the lever 168 and the control link 174. The front end of the link 174 is pivotally connected at 190 to the hand control lever LM.

In that form of the invention shown in Fig. 1 the hand lever LM is pivoted concentrically with the hand lever DM and accordingly utilizes the pivot or fulcrum 116. The hand lever LM has therein an arcuate slot 192 which, in conjunction with releasable means such as a wing nut 194, operates to effect releasable connection of the hand levers for movement at times in unison. When the connection 194 is released, the hand lever LM may be moved independently of the hand lever DM. When the connection is effected, movement of DM always entails movement of LM.

The operation of the load control phase of the system has previously been described without reference to how the load responder is actuated. As will be seen from the imediately preceding description, the load responder is actuated in response to fluid pressure variations in the top end of the levelling motor 134, which occurs because of the fluid-pressure-transmitting means established by the line 158 between the motor and the load responder cylinder 86. In other words, the arm 144, piston rod 138, piston 136 and fluid line 158 afford a force-transmitting means connected to the responder 84 and deriving motion incident to rocking of the rockshaft 142 when the implement tilts fore-and-aft. Accordingly, as the plow encounters increased working loads, the pressure in the upper end of the cylinder 134 will increase and the results of the pressure increases will be transmitted to the load responder piston 84 and will accordingly shift that piston forwardly against the load control spring 90 with the results previously elaborated. Conversely, when working pressures fall below a predetermined value, the pressure in the top end of the motor will return to normal and the load control spring 90 will return the load control piston to the left, again initiating the system for proper operation. Actuation of the actuator DA by any one of the three elements DM, DP or DR is co-ordinated by the differential follow-up means which will be readily recognized as being constituted by the several links and levers previously described. For example, a follow-up means or action is established between the elements DM, DA and DR by the parts 112, 104, 98, 94, 78 and 80. For those cases in which position compensation is desirable or required, the differential means has superimposed thereon the lever 104 and link 106. It will be remembered that the influence of the lever 104 as controlled by the position of the position responder DP will depend upon the relationship between the connection 124 and the pivot mount 102. When the draft control fulcrum means FM is locked out (Fig. 3), the lever 104 becomes in effect part of the lever 98 and the effect of the lever 78 is nullified. It is believed that the differential follow-up action will be apparent without further elaboration.

It will also be seen that the position responder DP has two functions. As previously described, it is capable of affecting the actuator DA. It is also capable of affecting the action of the actuator LA. This actuator is further influenced by the other position responder LP. There is therefore present a complex differential follow-up means or series of follow-up means utilizing parts of each other in common.

The levelling or pitch compensation provided here is based upon fore-and-aft movement of the signal link 36 and this movement is servo-controlled from the main or first rockshaft 40. For example, if the rear wheels of the tractor pass through a ditch or the tractor goes through a swale, the rise of the implement relative to the tractor will be transmitted through the draft link means 26 and lift link means 44 to the rockshaft 40, causing the rockshaft 40 to turn angularly in a clockwise direction. This means that the position responder DP will move in a clockwise direction, carrying the pivot point 186 to the left as seen in Fig. 1. At this point is should be noted that position compensation is locked out of the system by the particular setting of FM; hence, the valve 64 will not be effected and changes in position of DP as the rockshaft 40 turns will concern only the value 150. Since the movable control members DM and LM are fixed, the pivot 188 between the link 174 and the responder link 168 becomes a fulcrum for counterclockwise swinging of the responder link 168. The lower end of this link moves forwardly and operates through the link 172 to swing the second actuator lever 166 in a counterclockwise direction about a fulcrum established by the pivot 178. Accordingly, the actuator valve 150 for the actuator LA is shifted to the right, connecting the high pressure line 152 to the motor lines 162—164 that lead to the lower end of the motor 134. The upper end of the motor is connected to the reservoir via the line established by 158—86—160—154. Consequently, the levelling or pitch-compensating rockshaft 142 will move in a clockwise direction and the signal link 36 will move in a forward direction, causing the implement or plow to tilt forwardly about the transverse axis at 30. As the rockshaft 142 turns clockwise, the position responder LP also turns clockwise, moving the point 176 forwardly and transmitting force through the link 170 to the actuator link 166. This force serves to pivot the link 166 in a clockwise direction about the pivot 182 as a fulcrum and shifts the valve 150 to the left to restore the valve to neutral. If for any reason the relationship between the implement and tractor causes counterclockwise rotation of the main or first rockshaft 40, as because of a decrease in draft, the tractor rear wheels passing over a ridge, or the tractor going over a hill, the action just described would take place in the opposite sense.

Independent adjustment for fore-and-aft levelling may be accomplished by releasing the connection at 194 so that hand lever LM may be moved relative to the hand lever DM. Movement of the lever LM in a clockwise direction or forwardly of the tractor, results in forward and downward tilting of the plow. Movement of the hand lever in the opposite direction results, of course, in rearward and upward tilting of the plow.

During manually influenced working depth, as by actuation of the first or main hand lever DM, the other lever LM moves in unison with the lever DM and automatically changes the servoed relationship between the first or main rockshaft 40 and the fore-and-aft levelling rockshaft 142 so that the implement maintains its proper level in the ground. When the depth control lever or manually movable means DM is moved rearwardly or to the left in Fig. 1, for raising the implement, the preceding feature accomplishes parallel or near parallel lift. Near the end of the lift stroke, the levers 98 and 104 act as one to give position-responsive control and therefore limit the travel of the main or first rockshaft 40. Also, as the depth control lever DM is moved to the full-raised position, the oil supply to the levelling motor actuator LA is cut off by the right hand of the valve 64 covering the port to the line 152 so that the rockshaft 142 will not operate during this cycle so as to give the most efficient lift for the hitch. After the lifting cycle is completed, the port to the fore-and-aft levelling valve LA opens and the levelling rockshaft 142 moves to its proper position to give the desired kick-up to the implement for good transport. As the lever DM is moved forward for the lowered position of the implement, the valve 64 moves forward, porting oil from 50 and causing the rockshaft 40 to start the implement to lower. It should be noted that movement of the valve 64 does not shut off the oil supply to 152. The movement of the lever DM also moves the valve 150 to the right, porting oil to the lower end of the cylinder 134 so that rockshaft 142 starts to rotate clockwise, moving the link 36 forwardly so that an implement such as a plow will enter on its nose.

Figure 4:
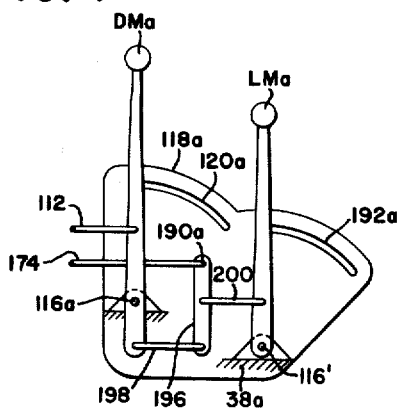
Figs. 4 and 5 are respectively views of modified forms of manual control means.

Fig. 1 represents one form of relationship between the control levers DM and LM. Fig. 4 illustrates a modification in which modified control levers, designated respectively as DMa and LMa, are carried on a suitable support as 38a, the lever DMa being fulcrumed at 116a and the lever LMa being fulcrumed at 116'. A sector 118a has an arcuate slot 120a for the lever DMa and a second arcuate slot 192a for the lever LMa. Each lever DMa, LMa is releasably retainable in a selected position by means of a suitable friction device or the like (not shown) as in the case of the lever DM. In Fig. 4, the levers DMa and LMa are differentially interconnected by an intervening lever 196, the upper end of which is pivotally connected at 190a to the link 174 and the lower end of which is pivotally connected by a link 198 to a depending portion of the lever DMa. The intermediate portion of the lever 196 is connected by a link 200 to an intermediate portion of the lever LMa. The result of the interconnection is that the lever LMa will, because of its friction device, remain stationary but the lever 196 will move in unison with the lever DMa when manual force is supplied solely to the DMa, thus effecting simultaneous adjustment of both valves DA and LA via the respective linkages 112 etc. and 174 etc. However, the lever LMa may be moved independently of the lever DMa when it is the recipient of manual force, in which case the lever DMa remains stationary, to adjust only the valve LA via the linkage 174 etc. without disturbing the valve DA, since the status of that valve is fixed by the link 112 which is in turn fixed by the stationary status of the lever DMa.

Figure 5:
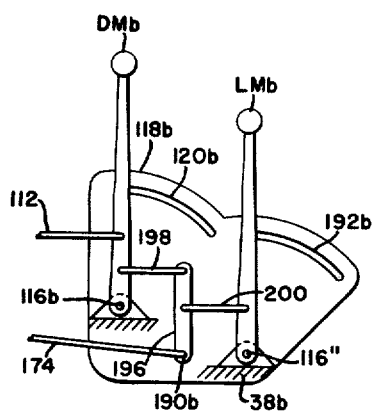

A reversal of the foregoing is shown in Fig. 5, wherein levers DMb and LMb are mounted on fulcra 116b and 116" on a suitable support 38b, this support including a sector 118b having slots 120b and 192b respectively cooperative with the levers DMb and LMb and including appropriate friction devices (not shown) for releasably retaining selected positions of the respective levers. As will be seen in that figure, the intervening lever 196 has its lower end pivotally connected at 190b to the link 174 and has its upper end connected by the link 198 to an intermediate portion of the lever DMb. The link 200 is again used between the intermediate portion of the lever 196 and, in this case, an intermediate portion of the lever LMb. When the lever DMb alone is moved, the lever LMb remains stationary and the lever 196 is rocked about its pivotal connection to the link 200. However, since the lever 196 will rock clockwise incident to clockwise rocking of the lever DMb, the link 174 will move incorrectly as respects the desired adjustment of the valve LA, but the error is readily correctible by the expedient of reversing linkage (not shown) between the link 174 and the lever 168. When the lever LMb alone is moved, the lever DMb remains fixed and independent adjustment of the valve LA via the lever LMb and linkage 174 etc. is available without affecting the valve Da. Again, the same results described above are accomplished and further description is deemed unnecessary.

Other features of the invention not categorically enumerated herein will undoubtedly occur to those versed in the art as will numerous modifications and alterations in the preferred embodiments disclosed, all of which may be achieved without departure from the spirit and scope of the invention.

What is claimed is:

1. Load control means for a tractor and associated ground-working implement wherein the tractor has vertically adjustable draft link means pivotally connected to the implement on a transverse axis about which the implement is tiltable fore-and-aft as working load thereon varies and wherein the implement has a signal member movable fore-and-aft in accordance with fore-and-aft tilting of the implement, said load control means comprising: a first tractor-mounted rockshaft connected to and for adjusting the draft link means; a first fluid motor powering said rockshaft; a fluid-pressure source on the tractor; first valve means fluid-connected to said source and to said motor and selectively shiftable to either side of a neutral position for controlling said motor; a second tractor-mounted rockshaft connected to and movable in unison with the signal member; a bi-directional second fluid motor having a piston connected to and for movement in unison with the second rockshaft; a load responder movable from and back to a normal position in accordance with changes in load on the implement; means interconnecting the responder and the first valve means for effecting valve means shifting by the responder, said responder having a fluid-pressure-receivable portion; fluid-pressure-transmitting means connecting one end of the second motor to said responder portion for moving the responder in accordance with fluid pressure variations incurred in said one end of the second motor as the piston therein is moved by the signal member when the implement tilts in response to variations in working load thereon; and second valve means fluid-connected to the pressure source and to opposite ends of the second motor and selectively shiftable to either side of a neutral position for activating the second motor to forcibly tilt the implement via the second rockshaft and signal member.

2. Load control means for a tractor and associated ground-working implement wherein the tractor has vertically adjustable draft link means pivotally connected to the implement on a transverse axis about which the implement is tiltable fore-and-aft as working load thereon varies and wherein the implement has a signal member movable fore-and-aft in accordance with fore-and-aft tilting of the implement, said load control means comprising: a first, tractor-mounted, fluid-pressure-operated power unit connected to and for effecting adjustment of the draft link means; a fluid-pressure source; first valve means fluid-connected to said source and unit and selectively shiftable to either side of a neutral position for controlling said unit; a second, tractor-mounted, fluid-pressure-operated unit having a piston connected to and movable in unison with the signal member; a load-responder movably mounted for position changes and connected to and for effecting shifting of the first valve means, said responder having a fluid-pressure-receivable portion fluid-connected to one end of the second unit so as to be subject to position changes as said piston is moved by the signal member when the implement tilts in response to variations in working load thereon; and second valve means fluid connected to the pressure source and to said second unit for selective shifting to either side of a neutral position for activating said second unit to forcibly tilt the implement via the signal member.

3. The invention defined in claim 2, including: a position responder connected to and movable by the first unit in accordance with adjustment of the draft link means by said first unit; and means interconnecting the position responder and the second valve means for shifting said second valve means in response to movement of the position responder so as to automatically tilt the implement in accordance with adjustment of the draft link means.

4. Load control means for a tractor and associated ground-working implement wherein the tractor has vertically adjustable draft link means pivotally connected to the implement on a transverse axis about which the implement is tiltable fore-and-aft as working load thereon varies and wherein the implement has a signal member movable fore-and-aft in accordance with fore-and-aft tilting of the implement, said load control means comprising: a first, tractor-mounted, fluid-pressure-operated power unit connected to and for effecting adjustment of the draft link means; a fluid-pressure source; first valve means fluid-connected to said source and unit and selectively shiftable to either side of a neutral position for controlling said unit; a second, tractor-mounted, fluid-pressure-operated unit having a piston connected to and movable in unison with the signal member; a load-responder movably mounted for position changes and having a fluid-pressure-receivable portion fluid-connected to one end of the second unit so as to be subject to position changes as said piston is moved by the signal member when the implement tilts in response to variations in working load thereon; manual means movable to shift the valve means; differential follow-up means interconnecting said valve means, said responder and said manual means for effecting valve means shifting by either said responder or said manual means; and second valve means fluid connected to the pressure source and to said second unit for selective shifting to either side of a neutral position for activating said second unit to forcibly tilt the implement via the signal member.

5. Load control means for a tractor and associated ground-working implement wherein the tractor has vertically adjustable draft link means pivotally connected to the implement on a transverse axis about which the implement is tiltable fore-and-aft as working load thereon varies and wherein the implement has a signal member movable fore-and-aft in accordance with fore-and-aft tilting of the implement, said load control means comprising: a first, tractor-mounted, fluid-pressure-operated power unit connected to and for effecting adjustment of the draft link means; a fluid-pressure source; first valve means fluid-connected to said source and unit and selectively shiftable to either side of a neutral position for controlling said unit; a second, tractor-mounted, fluid-pressure-operated unit having a piston connected to and movable in unison with the signal member; a load-responder movably mounted for position changes and having a fluid-pressure-receivable portion fluid-connected to one end of the second unit so as to be subject to position changes as said piston is moved by the signal member when the implement tilts in response to variations in working load thereon; first manual means movable to shift the valve means; second valve means fluid connected to the pressure source and to said second unit for selective shifting to either side of a neutral position for activating said second unit to forcibly tilt the implement via the signal member; second manual means movable to shift the second valve means; a position responder connected to and movable by the first unit in accordance with adjustment of the draft link means by said first unit; means interconnecting the first and second manual means for movement in unison, said interconnecting means including a device enabling selective independent movement of the second manual means; first differential follow-up means interconnecting the first valve means, the first manual means and the load responder for returning the first valve means to neutral by the load responder after shifting of said first valve means by the first manual means; and second differential follow-up means interconnecting the second valve means, the second manual means and the position responder for returning the second valve means to neutral by the position responder after shifting of said second valve means by the second manual means when moved in unison with the first manual means.

6. The invention defined in claim 5, including: a second position responder connected to and movable by the second unit in accordance with tilting of the implement by said second unit; and third differential follow-up means interconnecting said second position responder and the second follow-up means for returning the second valve means to neutral by said second responder after shifting of said second valve means by independent movement of said second manual means.

7. For use with an agricultural implement adapted for connection to a tractor having a source of power, the improvement comprising: lower trailing draft link means connected at its front end to the tractor for raising and lowering movement relative to the tractor about a first transverse pivot and connected at its rear end to the implement on a second transverse pivot; signal link means pivotally connected at its rear end to the implement above the second pivot and having its front end proximate to the tractor and at a level above the first pivot; first power means on the tractor and connected to the draft link means for effecting raising and lowering of the implement, said power means including a responder part movable in accordance with movement of the draft link means; a rockshaft on the tractor having an arm connected to the front end of the signal link means for moving said signal link means fore-and-aft by rocking of the rockshaft and thus to vary the tilt of the implement about the aforesaid second transverse pivot; second power means on the tractor and powering the rockshaft; actuating means for activating and de-activating the second power means; and means interconnecting the actuating means and the aforesaid responder part for activating the second power means in response to movement of the responder part.

8. For use with an agricultural implement adapted for connection to a tractor having a source of power, the improvement comprising: lower trailing draft link means connected at its front end to the tractor for raising and lowering movement relative to the tractor about a first transverse pivot and connected at its rear end to the implement on a second transverse pivot; signal link means pivotally connected at its rear end to the implement above the second pivot and having its front end proximate to the tractor and at a level above the first pivot; first power means on the tractor and connected to the draft link means for effecting raising and lowering of the implement; a rockshaft on the tractor having an arm connected to the front end of the signal link means for moving said signal link means fore-and-aft by rocking of the rockshaft and thus to vary the tilt of the implement about the aforesaid second transverse pivot; second power means on the tractor and powering the rockshaft; actuating means for activating and de-activating the second power means; a responder part connected to and deriving movement from the implement in accordance with vertical movement of the implement as provided by the draft link means; and means interconnecting the actuating means and the aforesaid responder part for activating the second power means in response to movement of the responder part.

9. The invention defined in claim 8, including: manual means connected to the actuating means for activating and de-activating the second power unit independently of movement of the responder part.

10. For use with an agricultural implement adapted for connection to a tractor having a source of power, the improved comprising: lower trailing draft link means connected at its front and to the tractor for raising and lowering movement relative to the tractor about a first transverse pivot and connected at its rear end to the implement on a second transverse pivot; signal link means pivotally connected at its rear end to the implement above the second pivot and having its front end proximate to the tractor and at a level above the first pivot; first power means on the tractor and connected to the draft links for raising the draft links and accordingly to raise the implement about the first transverse pivot, said power means having a one-way connection therein enabling ground-influenced upward movement of the implement and draft links independently of operation of said power means; a rockshaft on the tractor having an arm connected to the front end of the signal link means for moving said signal link means fore-and-aft by rocking of the rockshaft and thus to vary the tilt of the implement about the aforesaid second transverse pivot; second power means on the tractor and active in one direction to rock the rockshaft for shifting the signal link means forwardly to thereby tilt the implement downhill about the aforesaid second transverse pivot; actuating means normally neutrally positioned to de-activate the second power means but positionable to activate said second power means; a responder connected to and movable in response to upward movement of the implement; and means interconnecting said responder and the actuating means for activating the second power means to tilt the implement downhill as foresaid as said implement moves upwardly.

11. In a tractor and implement outfit in which the implement is vertically adjustable relative to the tractor by means of a power unit controlled by a movable actuator and wherein the outfit includes a manually movable member, a position responder movable in response to adjustment of the implement and a load responder movable in response to variations in working load on the implement, the improved comprising: a load lever pivoted intermediate its ends to the load responder; an actuator lever pivoted at one end to the actuator; first force-transmitting means pivotally interconnecting the other end of the actuator lever and one end of the load lever; an auxiliary lever having a pivot mount at one end on an intermediate portion of the actuator lever; second force-transmitting means pivotally interconnecting the other end of the auxiliary lever and the position responder; third force-transmitting means having a first pivotal connection to the manually movable member and a second pivotal connection to the auxiliary lever adjacent to the aforesaid pivot mount; biasing means interconnecting the auxiliary and actuator levers and urging them toward each other about said pivot mount and causing the actuator lever to act through the first force-transmitting means to pivot the load lever relative to the load responder; and a tractor mounted fulcrum engaging the other end of said load lever and opposing said biasing-means—influenced pivoting of said load lever.

12. The invention defined in claim 11, in which: the second pivotal connection of the third force-transmitting means is selectively adjustable relative to the pivot mount to vary the effective moment arm between said pivot mount and said second pivotal connection.

13. The invention defined in claim 11, in which: the tractor-mounted fulcrum is arranged for selective setting in a first position, opposing biasing-means-influenced pivoting of the first lever as aforesaid, and in a second position permitting said pivoting so that said second and third levers move toward each other; and said second and third levers include cooperative stop elements interengageable when the levers move toward each other.

14. The invention defined in claim 11, in which the implement is tiltable fore-and-aft by a second power unit under control of a second actuator and wherein the outfit additionally includes a second manually movable member and a second position responder movable in response to tilting of the implement, further comprising: a second actuator lever pivotally connected at one end to the second position responder and at its other end to the second actuator; a responder lever pivoted at one end to the first position responder and at its other end to an intermediate portion of the second actuator lever; and a force-transmitting connection between the second manually movable member and an intermediate portion of the responder lever.

15. The invention defined in claim 14, including: means interconnecting the two manually movable members for movement in unison by manual force applied to the first member and for movement of the second member independently of the first by manual force applied to said second member.

16. In a tractor and implement outfit in which the implement is vertically adjustable relative to the tractor by means of a first power unit controlled by a first movable actuator and the implement is tiltable fore-and-aft by a second power unit under control of a second actuator and wherein the outfit includes first and second manually movable members, a first position responder movable in response to adjustment of the implement, a second position responder movable in response to tilting of the implement, and a load responder movable in response to variations in working load on the implement, the improvement comprising: a load lever pivoted intermediate its ends to the load responder; a first actuator lever pivoted at one end to the first actuator and at its other end to one end of the load lever; tractor carried fulcrum means engaging the other end of said load lever; an auxiliary lever having a pivot mount at one end on an intermediate portion of the first actuator lever and pivotally connected at its other end to the first position responder; force-transmitting means pivotally interconnecting the first manually movable member and an intermediate portion of the auxiliary lever; a second actuator lever pivotally connected at one end to the second position responder and at its other end to the second actuator; a responder lever pivoted at one end to the first position responder and at its other end to an intermediate portion of the second actuator lever; a control lever fulcrumed intermediate its ends on the second manually movable member; force-transmitting means pivotally connecting one end of the control lever to an intermediate portion of the responder lever; and another force-transmitting means pivotally interconnecting the other end of said control lever to the first manually movable member.

17. In a tractor and implement outfit in which the implement is vertically adjustable relative to the tractor by means of a first power unit controlled by a first movable actuator and the implement is tiltable fore-and-aft by a second power unit under control of a second actuator and wherein the outfit includes first and second manually movable members, a first position responder movable in response to adjustment of the implement, a second position responder movable in response to tilting of the implement, and a load responder movable in response to variations in working load on the implement, the improvement comprising: a load lever fulcrumed intermediate its ends on the load responder; tractor-carried fulcrum means engaging one end of said load lever; a first actuator lever fulcrum-connected intermediate its ends to the first manually movable member and having one end pivotally connected to the other end of the load lever and its other end pivotally connected to the first actuator; a second actuator lever pivotally connected at opposite ends respectively to the second position responder and the second actuator; a responder lever pivoted at one end to the first position responder and at its other end to an intermediate portion of the second actuator lever; and force-transmitting means pivotally connecting an intermediate portion of said responder lever to the second manually movable member.

18. For use with an agricultural implement and a tractor having a power source, the improvement comprising: draft linkage vertically movably connected to the tractor and having a connection to the implement to carry the implement for vertical adjustment and also to enable fore-and-aft tilting of said implement; first and second independent power means on the tractor and powered by said power source, said first and second power means respectively including first and second independent tractor-mounted rockshafts; means connecting the first rockshaft to the draft linkage for effecting vertical movement of the linkage and the implement; first manual control means for selectively activating and deactivating the first power means to select any one of a plurality of vertically adjusted operating positions for the implement; means connecting the second rockshaft to the implement for effecting fore-and-aft tilting of the implement; and second manual control means for selectively activating and deactivating the second power means to select any one of a plurality of fore-and-aft tilted positions of the implement.

19. Load control means for a tractor and associated ground-working implement wherein the tractor has vertically adjustable draft link means pivotally connected to the implement on a transverse axis about which the implement is tiltable fore-and-aft as working load thereon varies and wherein the implement has a signal member movable fore-and-aft in accordance with fore-and-aft tilting of the implement, said load control means comprising: a first tractor-mounted rockshaft connected to and for adjusting the draft link means; a first fluid motor powering said rockshaft; a fluid-pressure source on the tractor; first valve means fluid-connected to said source and to said motor and selectively shiftable to either side of a neutral position for controlling said motor; a second tractor-mounted rockshaft connected to and movable in unison with the signal member; a bi-directional second fluid motor having a piston connected to and for movement in unison with the second rockshaft; a load responder movable from and back to a normal position in accordance with changes in load on the implement; means interconnecting the responder and the first valve means for effecting valve means shifting by the responder; force-transmitting means connected to the responder and deriving motion incident to rocking of the second rockshaft by the signal member when the implement tilts in response to variations in working load thereon; and second valve means fluid-connected to the pressure source and to opposite ends of the second motor and selectively shiftable to either side of a neutral position for activating the second motor to forcibly tilt the implement via the second rockshaft and signal member.

20. For use with an agricultural implement and a tractor having a power source, the improvement comprising: draft linkage vertically movably connected to the tractor and having a connection to the implement to carry the implement for vertical adjustment and also to enable fore-and-aft tilting of said implement; first and second independent, wholly tractor-mounted power means powered by said power source; means connecting the first power means to the draft linkage for effecting vertical movement of the linkage and the implement; first manual control means for selectively activating and deactivating the first power means to select any one of a plurality of vertically adjusted operating positions for the implement; means connecting the second power means to the implement for effecting fore-and-aft tilting of the implement; and second manual control means for selectively activating and deactivating the second power means to select any one of a plurality of fore-and-aft tilted positions of the implement.

21. For use with an agricultural implement and a tractor having a power source, the improvement comprising: draft linkage vertically movably connected to the tractor and having a connection to the implement to carry the implement for vertical adjustment and also to enable fore-and-aft tilting of said implement; first and second independent power means on the tractor and powered by said power source, said first and second power means respectively including first and second independent tractor-mounted rockshafts; means connecting the first rockshaft to the draft linkage for effecting vertical movement of the linkage and the implement; means connecting the second rockshaft to the implement for effecting fore-and-aft tilting of the implement; first actuating means for selectively activating and deactivating the first power means; second actuating means for selectively activating and deactivating the second power means; first and second control members connected respectively to the first and second actuator means; and means interconnecting the control members for operation of the two actuating means simultaneously by the first control member, said interconnecting means being constructed and arranged to afford independent operation of the second actuating means by the second control member.

22. For use with an agricultural implement and a tractor having a power source, the improvement comprising: draft linkage vertically movably connected to the tractor and having a connection to the implement to carry the implement for vertical adjustment and also to enable fore-and-aft tilting of said implement; first and second independent power means on the tractor and powered by said power source, said first and second power means respectively including first and second independent tractor-mounted rockshafts; means connecting the first rockshaft to the draft linkage for effecting vertical movement of the linkage and the implement; means connecting the second rockshaft to the implement for effecting fore-and-aft tilting of the implement; a responder part connected to the first power means and movable incident to vertical movement of the draft linkage; first actuating means for activating and deactivating the first power means; second actuating means for activating and deactivating the second power means; and means interconnecting the second actuating means and the responder part for activating the second power means in response to movement of the responder part.

23. The invention defined in claim 22, including: another responder part connected to the second power means and movable incident to fore-and-aft tilting of the implement; and means interconnecting said second-named responder part and the first actuating means for activating the first power means in response to movement of said second-named responder part.

24. Load control means for a tractor and associated ground-working implement wherein the tractor has vertically adjustable draft link means pivotally connected to the implement on a transverse axis about which the implement is tiltable fore-and-aft as working load thereon varies and wherein the implement has a signal member movable fore-and-aft in accordance with fore-and-aft tilting of the implement, said load control means comprising: a first fluid-pressure-operated power unit connected to and for effecting adjustment of the draft link means; a fluid-pressure source; first valve means for controlling said unit; a second fluid-pressure-operated unit having relatively movable cylinder and piston parts, one of said parts being connected to and movable in unison with the signal member; a load-responder movably mounted for position changes and connected to and for operating the first valve means, said responder having a fluid-pressure-receivable portion fluid-connected to one end of the second unit so as to be subject to position changes as said one part is moved by the signal member when the implement tilts in response to variations in working load thereon; and second valve means for activating said second unit to forcibly tilt the implement via the signal link.

25. For use with an agricultural implement adapted for connection to a tractor having a source of power, the improvement comprising: first link means connected at its front end to the tractor for raising and lowering movement relative to the tractor about a first transverse pivot and connected at its rear end to the implement on a second transverse pivot; second link means pivotally connected at its rear end to the implement in vertically spaced relation to the second pivot and having its front end proximate to the tractor and at a level spaced vertically from the first pivot; first power means on the tractor and connected to the first link means for effecting raising and lowering of the implement, said power means including a responder part movable in accordance with movement of the first link means; an operating member movable on the tractor and connected to the front end of the second link means for moving said second link means fore-and-aft and thus to vary the tilt of the implement about the aforesaid second transverse pivot; second power means on the tractor and powering the operating member; actuating means for activating and deactivating the second power means; and means interconnecting the actuating means and the aforesaid responder part for activating the second power means in response to movement of the responder part.

26. Load control means for a tractor and associated ground-working implement wherein the tractor has vertically adjustable draft link means pivotally connected to the implement on a transverse axis about which the implement is tiltable fore-and-aft as working load thereon varies and wherein the implement has a signal member movable fore-and-aft in accordance with fore-and-aft tilting of the implement, said load control means comprising: a first tractor-mounted operating member connected to and for adjusting the draft link means; a first fluid motor powering said member; a fluid-pressure source on the tractor; first valve means fluid-connected to said source and to said motor for controlling said motor; a second tractor-mounted operating member connected to and movable in unison with the signal member; a bi-directional second fluid motor having a part connected to and for movement in unison with the second operating member; a load responder movable from and back to a normal position in accordance with changes in load on the implement; means interconnecting the responder and the first valve means for effecting valve means shifting by the responder; force-transmitting means connected to the responder and deriving motion incident to movement of the second operating member by the signal member when the implement tilts in response to variations in working load thereon; and second valve means fluid connected to the pressure source and to opposite ends of the second motor for activating the second motor to forcibly tilt the implement via the second operating member and signal member.

References Cited in the file of this patent

UNITED STATES PATENTS

| 2,416,373 | Brown | Feb. 25, 1947 |
| 2,455,727 | Bunting | Dec. 7, 1948 |
| 2,680,401 | Heller et al. | June 8, 1954 |
| 2,722,874 | Bopf | Nov. 8, 1955 |
| 2,755,721 | Rusconi | July 24, 1956 |

FOREIGN PATENTS

| 728,858 | Great Britain | Apr. 27, 1955 |